G. A. STEINLE.
LATHE CARRIAGE.
APPLICATION FILED MAR. 30, 1908.
990,504.
Patented Apr. 25, 1911.
3 SHEETS—SHEET 3.
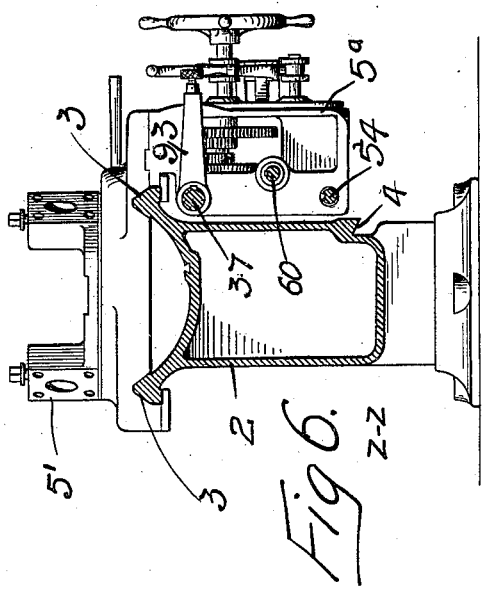
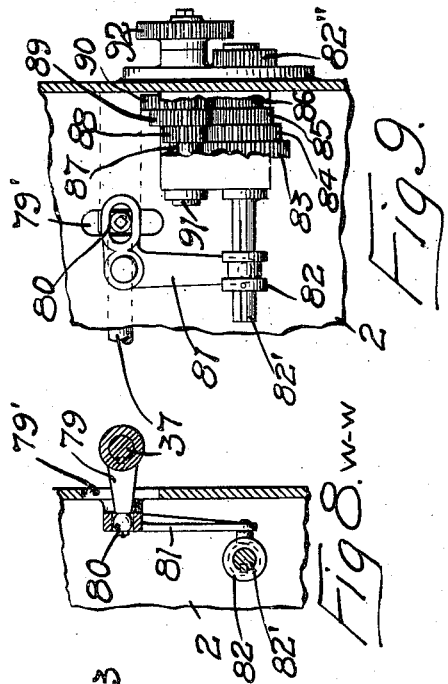
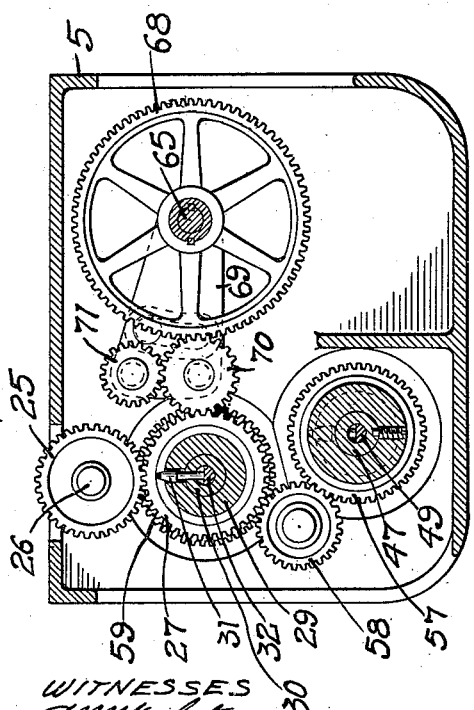
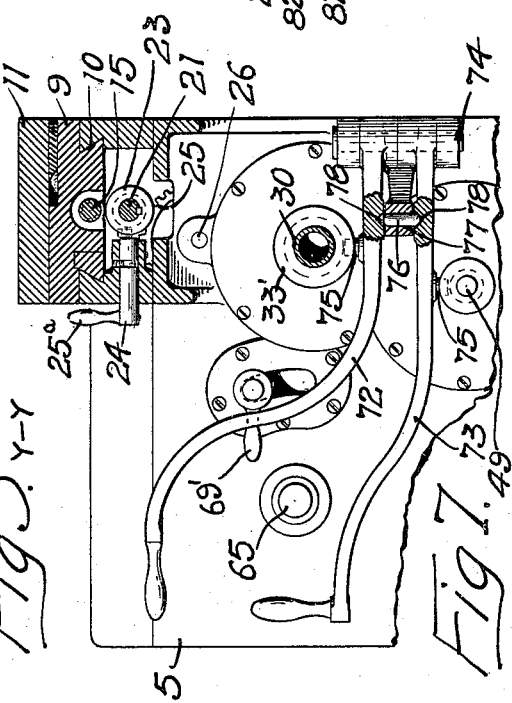
WITNESSES
INVENTOR
GEORGE A. STEINLE
BY Paul & Paul
HIS ATTORNEYS

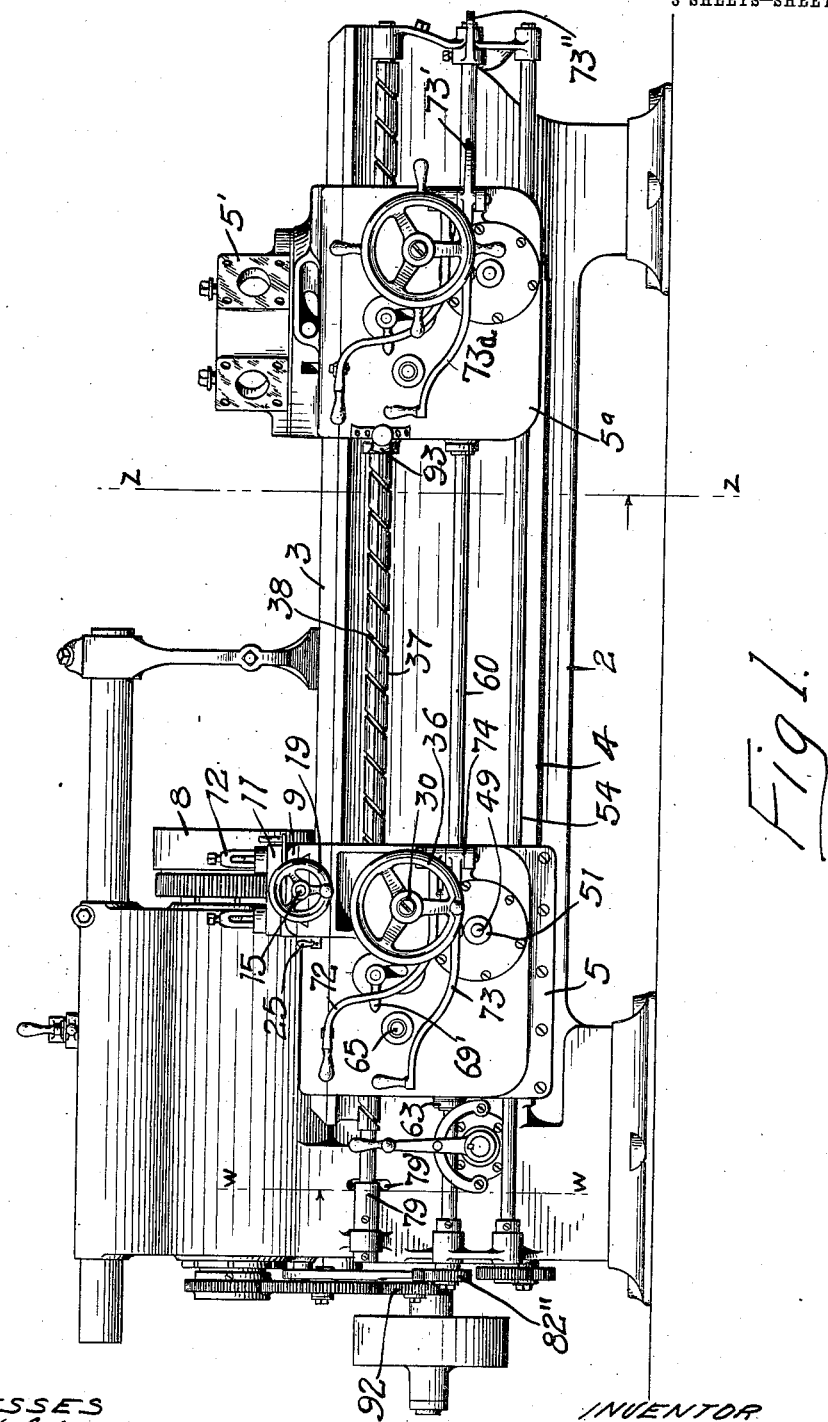

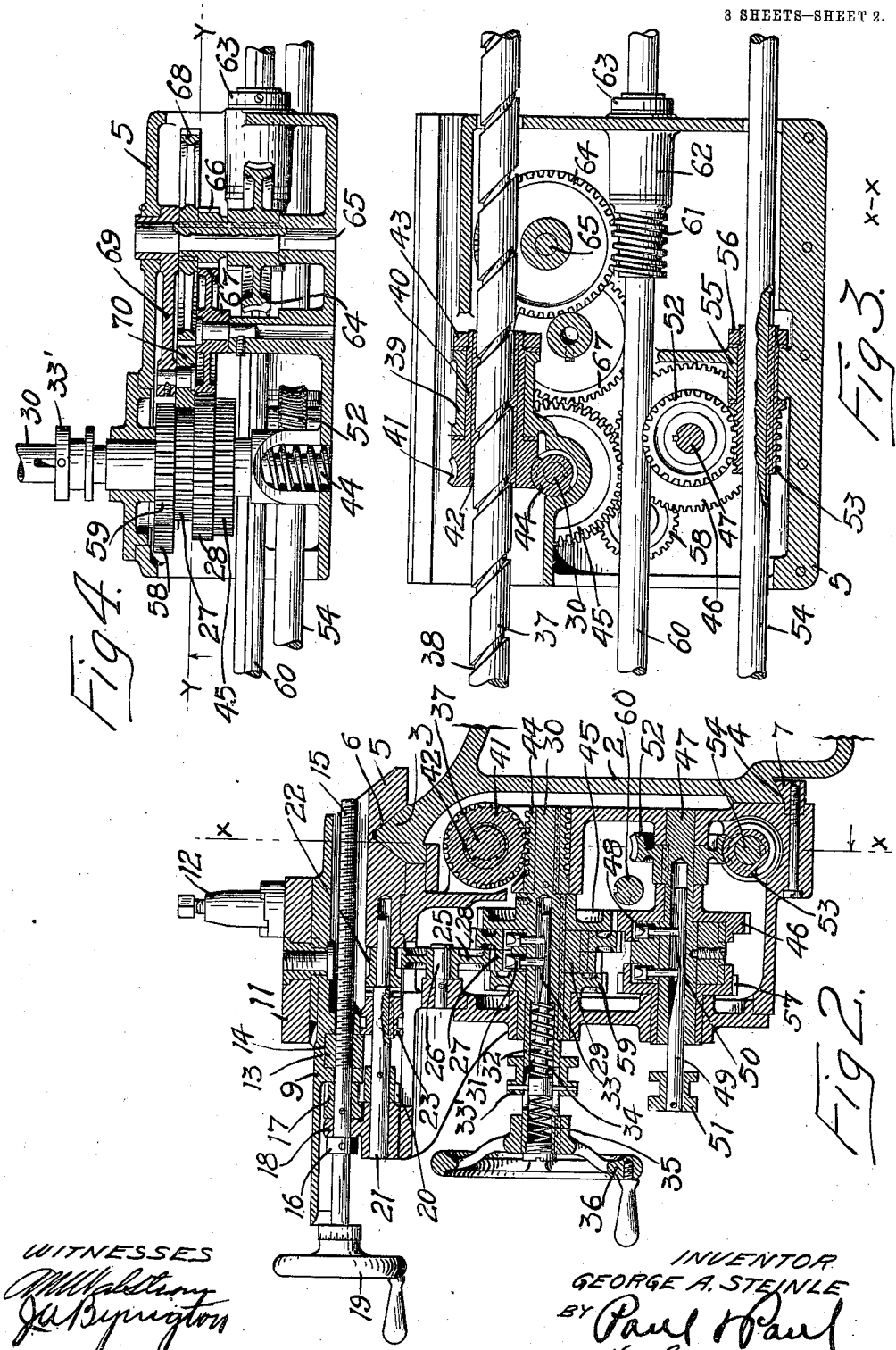

UNITED STATES PATENT OFFICE.

GEORGE A. STEINLE, OF MADISON, WISCONSIN, ASSIGNOR TO STEINLE TURRET MACHINE COMPANY, OF MADISON, WISCONSIN, A CORPORATION.

LATHE-CARRIAGE.

990,504.         Specification of Letters Patent.    Patented Apr. 25, 1911.

Application filed March 30, 1908. Serial No. 424,159.

*To all whom it may concern:*

Be it known that I, GEORGE A. STEINLE, of Madison, Dane county, Wisconsin, have invented certain new and useful Improvements in Lathe-Carriages, of which the following is a specification.

An object of the invention is to provide a lathe carriage of simple compact construction which shall be easy of adjustment and operation.

The invention consists in the parts hereinafter described and pointed out in the appended claims.

In the accompanying drawings forming part of this specification; Figure 1 is a side elevation of a lathe embodying my invention. Fig. 2 is a vertical sectional view through the primary and secondary carriages showing the means for supporting them on the lathe bed. Fig. 3 is a sectional view on the line $x$—$x$ of Fig. 2. Fig. 4 is a horizontal sectional view illustrating the driving connection between the carriage feed shaft and the operating clutches. Fig. 5 is a sectional view on the line $y$—$y$ of Fig. 4. Fig. 6 is a vertical sectional view on the line $z$—$z$ of Fig. 1 looking in the direction of the arrow. Fig. 7 is a side elevation partially in section of the primary and secondary lathe carriage illustrating the manner of mounting the secondary carriage upon the primary one. Fig. 8 is a detail sectional view on the line $w$—$w$ of Fig. 1, looking in the direction of the arrow. Fig. 9 is a detail sectional view illustrating the driving connections for the feed shaft and the means for shifting the gears to vary the speed.

This application will be confined to the lathe carriages and the mechanism for operating the same. I have illustrated in Fig. 1 a side elevation of a complete lathe but that portion of the machine at the left hand end of the figure is shown and described in a pending application for United States patent filed by me on the 11th day of January, 1908, Serial No. 410,367, and hence I make no claim thereon, nor is detailed description necessary.

2 represents the horizontal bed of the lathe. This is provided as indicated in Fig. 6 with ways 3, V-shaped substantially in cross section and extending parallel with one another upon the top of the lathe bed. A recessed way 4 is provided on one side of the lathe frame near the base thereof. A carriage 5 has a recess 6 to receive one of the ways 3 and a rail 7 to enter the recess 4. The rail 7 is capable of removal from the carriage to allow it to be detached from the lathe. This carriage is capable of movement back and forth on the lathe bed and as it only extends partially over or across said bed it is capable of sliding past the chuck 8 without contacting therewith, as indicated in Fig. 1. This allows the secondary carriage to be moved entirely out of the path of the turret carriage, or, when it is desired, to permit adjusting the secondary carriage tool at a different angle with respect to the work than can be accomplished with a carriage as ordinarily constructed.

9 represents the secondary carriage having a sliding connection 10 with the primary carriage 5 and adapted to move in a direction substantially at right angles to the direction of movement of the carriage 5. This secondary carriage supports a revolving table 11 upon which tool carriers 12 are mounted. A nut 13 is provided within a recess 14 in said secondary carriage and is adapted to receive a threaded rod 15 that is held against longitudinal movement by a collar 16 and pinion 17 secured to said rod upon opposite sides of a lug 18 through which said rod passes. The lug 18 is formed on the carriage 5 and when the rod 15 is revolved by power or by means of the operating wheel 19 the nut 13 and the secondary carriage connected therewith will be moved transversely of the lathe and the tools secured in the carriers 12 will be adjusted in the desired position with respect to the work.

Two separate independently movable carriages are shown, one of which I have designated by reference numeral 5 and the other, equipped with substantially the same operating mechanism, I will designate by reference numeral 5ª. The carriage 5 supports the secondary transversely operating carriage as described, and has a single bearing on the lathe bed at the top of the frame. The other carriage 5ª extends across the lathe bed, as indicated in Fig. 6, and has two bearings thereon and supports the turret 5'.

A pinion 20 is secured on a shaft 21 that is mounted in the primary carriage parallel with the rod 15, the pinion 20 meshing with the pinion 17 to revolve the threaded rod and move the secondary carriage. A pinion 22 is loosely mounted on the shaft 21 and a clutch 23 splined on said shaft is adapted to move toward or from the pinion 22 and lock or release it. This clutch 23 is operated by means of a rock shaft 24 having an operating handle 25ª (see Fig. 7). An idle gear 25 is mounted on a stud 26 and meshes with the pinion 22 and with a gear ring 27. A similar ring 28 is provided beside the ring 27 and both of them inclose a clutch hub 29 mounted on a hollow shaft 30 and provided with locking pins 31. These clutches are similar to the one shown and described in a certain pending application for Letters Patent of the United States filed by me January 11, 1908, Serial No. 410,366, said clutch consisting of a gear ring, a split or expansion ring and a wedge-shaped pin adapted to be forced outwardly to spread the expansion ring and clamp the gear ring. I make no claim to this clutch in this application and hence do not illustrate it in detail. The shaft 30 has bearings in the carriage 5 and a rod 32 is provided within said shaft and has a recess 33 to receive the ends of said locking pins, one pin being thrown outwardly to lock its ring on the hub while the other one is allowed to move inwardly to release its ring. A clutch collar 33' is attached to the rod 32 and is slidably mounted on the hollow shaft 30, and springs 34 and 35 are provided within said shaft 30 for normally holding said rod in position to release both locking pins and allow their gear rings to run idle. An operating wheel 36 is mounted on the end of the hollow shaft.

37 is a lead screw shaft mounted in the frame of the lathe and provided with a helical groove 38 in its periphery extending from end to end thereof. A hub 39 is mounted on the carriage frame and incloses a sleeve 40 on one end of which is a worm gear wheel 41. A sleeve 42 of Babbitt metal is provided between the sleeve 40 and the shaft 37, and the sleeve 42 has interiorly arranged threads thereon adapted to enter the groove 38. The sleeve 40 is held in place in the hub 39 by a lock nut 43 and the worm wheel 41 meshes with a pinion 44 secured on the hollow shaft 30. When therefore, the hollow shaft is revolved the sleeve 40 will be operated also and the carriage moved back and forth on the shaft 37.

A gear 45 is secured on the shaft 30 and meshes with a gear 46 loosely mounted on a shaft 47 and controlled by a locking pin 48 that is operated by a rod 49 having a recess 50 corresponding to the one described. The rod 49 has a collar 51 thereon to which the operating lever is attached, as will hereinafter appear. A worm gear 52 is secured on the shaft 47 and meshes with a worm sleeve 53 on a shaft 54, said sleeve passing through a hub 55 on the carriage and being secured therein by a lock nut 56. The shaft 54 runs continuously and at a comparatively high speed and is adapted to move the carriage back and forth toward or from the work expeditiously, and save time in the operation of adjusting the same. The connection through the gear 46 and the gear 45 with the worm 44 will serve to move the lathe carriage in one direction, and for the purpose of operating it in the opposite direction I provide a gear 57 having a locking pin corresponding to the one described, and operable by the movement of the rod 49 and meshing through the intermediate idle gear 58 with a gear 59 that is also secured on the shaft 30. This arrangement of the gears will have the effect of moving the carriage in the opposite direction from that obtained by means of the gears 45 and 46, and by moving the rod 49 in or out I am able to connect the shaft 37 with the high speed shaft 54 and rapidly move the carriage back and forth on the lathe bed.

60 is the feed shaft through which power is applied to move the lathe carriage when in its working position. This shaft 60 has an exteriorly threaded sleeve 61 fitting within a hub 62 and secured by a lock nut 63. The worm sleeve 61 meshes with a worm wheel 64 mounted on a shaft 65. A pinion 66 is secured on said shaft and meshes with an idle gear wheel 67 through which the gear ring 28 is driven. A gear wheel 68 is secured on the shaft 65 and an arm 69 is loosely mounted in the casing of the carriage and supports two gears 70 and 71 (see Fig. 5). In this figure the gear 70 is in engagement with the gear 68 and the clutch gear ring 27, and the gear 70 is also in engagement with the gear 71. When the gears are in the position illustrated in Fig. 5 the gear 68 and the gear ring 27 will be operated in the same direction and through the connection of the gear ring with shaft 30, the carriage will be fed on the lathe bed to keep the tool in operative position with respect to the work. When the arm 69 is dropped down until the gear 70 is out of engagement with the gear ring, and the gear 71 is in mesh with the gear ring 27 the movement of the gear 68 through the gears 70 and 71 to the gear ring will cause the latter to travel in the opposite direction and thereby the movement of the lathe carriage may be reversed. A clamping lever 69' is connected to the arm 69 through an opening in the lathe frame, and by grasping this lever the operator can easily obtain the desired adjustment of the gears 70 and 71.

For the purpose of operating the collars 33' and 51 I provide levers 72 and 73 pivotally supported at 74 on the side of the carriage and having pins 75 projecting into the annular grooves in said collars, so that when the levers are oscillated the collars will be moved back and forth to render the clutch locking pins operative or inoperative. To prevent both of these levers being operated at the same time I provide a locking device similar to that shown and described in my application above referred to, and consisting of a pin 76 adapted to slide in a socket 77 and enter recesses 78 in said levers. To operate one lever the other lever must be in its normal position so that its recess will receive the end of the pin. In case one lever is out of its normal position the pin will lock the other lever and prevent its premature movement. As stated, the carriages 5 and 5ª have similar operating mechanisms and in addition the carriage 5ª has its lever 73ª provided with an arm 73' that is adapted to be engaged by a finger 73" that is adjustably mounted on the shaft 60, said finger causing the return of the lever 73 to its normal inoperative position and disengaging the lathe mechanism from the speed shaft 54, thereby preventing breakage in case the operator should fail to throw the said lever at the proper time.

For the purpose of changing the speed of the feed shaft 60 I provide a mechanism in connection with the lead screw shaft 37, by means of which the speed of the shaft 60 and its connections will be controlled. Said lead screw shaft 37 while normally held stationary, is capable of a rocking motion in its bearings. 79 is an arm secured on said lead screw shaft and extending through a slot 79' in the wall of the lathe and having a loose connection at 80 with a bell crank 81. This bell crank is mounted on the wall within the lathe and is connected to a clutch 82 that is slidably mounted on a shaft 82'. This shaft has a driving connection 82" with the feed shaft 60, and is equipped with a series of gears 83, 84, 85 and 86 loosely mounted but capable of being locked by the operation of the clutch device. A series of gears 87, 88, 89 and 90 are mounted on a drive shaft 91 having a driven gear 92. The lead screw shaft 37 has an operating lever 93 by means of which the shaft may be rocked, the clutch 82 operated, and the driving gears locked or leased to change the speed of the feed shaft.

By means of the mechanism described, the operator has positive accurate control over both lathe carriages, can move them rapidly from point to point on the bed, and by the simple movement of a lever can shift the drive from the speed shaft to the feed shaft, and by the rocking of the lead screw shaft obtain any desired speed of the feed shaft. The manner of mounting the carriage 5 on the lathe bed allows it to be moved to a point past the lathe chuck and sets the tool at an angle to the work that cannot ordinarily be obtained with a lathe carriage as usually made.

The turret mechanism I do not illustrate or describe in detail in this application as it forms the subject matter of a separate application herewith.

I claim as my invention:

1. The combination in a lathe, of a normally stationary lead screw shaft mounted for rocking movement, a continuously operable feed shaft, a carriage, a revoluble nut mounted in the carriage, and engaging the lead screw shaft, gearing connections between the feed shaft and the nut, and a gear mechanism for changing the speed of the feed shaft, said gear mechanism being under the control of the rocking lead screw shaft.

2. The combination in a lathe, of a normally stationary lead shaft mounted for rocking movement, a continuously operable feed shaft, a carriage, means mounted in the carriage and engaging the lead shaft, devices for connecting said means with the feed shaft, and a gear mechanism for changing the speed of the feed shaft, said gear mechanism being under the control of the rocking lead shaft.

In witness whereof, I have hereunto set my hand this 24th day of March 1908.

GEORGE A. STEINLE.

Witnesses:
G. S. MARTIN,
WM. R. BAGLEY.

---

Copies of this patent may be obtained for five cents each, by addressing the "Commissioner of Patents, Washington, D. C."